United States Patent [19]

Gay et al.

[11] 4,377,730
[45] Mar. 22, 1983

[54] TONE ELIMINATION CIRCUIT

[75] Inventors: Michael J. Gay, Vaud, Switzerland; W. David Pace, Tempe, Ariz.

[73] Assignee: Motorola, Inc., Schaumburg, Ill.

[21] Appl. No.: 271,330

[22] Filed: Jun. 8, 1981

[51] Int. Cl.³ .......................... H04B 1/58; H04B 3/20
[52] U.S. Cl. ........................ 179/170 NC; 179/170.2; 179/170.4
[58] Field of Search ....... 179/170 R, 170 NC, 170 D, 179/170.2, 170.6, 170.8, 170 C, 16 A, 16 AA, 18 F, 18 FA, 170.4

[56] References Cited

U.S. PATENT DOCUMENTS 3,769,466 10/1973 Von Pfeil et al. ............... 179/170.4
4,004,109 1/1977 Boxall .......................... 179/170 NC
4,320,498 3/1982 Justice ......................... 179/170 NC Primary Examiner—G. Z. Rubinson
Assistant Examiner—Randall P. Myers
Attorney, Agent, or Firm—Michael D. Bingham

[57] ABSTRACT

A cancellation circuit which may be utilized in a subscriber loop interface circuit to allow a tone to be supplied in the receive path of the hybrid circuit to be received by the calling subscriber and for cancelling said tone from being transmitted to a called subscriber that is coupled via a carrier channel to the hybrid circuit. The cancellation circuit comprises circuitry responsive to the tone appearing on the transmit path for supplying in-phase and quadrature phase signals at the frequency of this tone to cancel the same to prohibit transmission thereof while simultaneously varying the output impedance of the hybrid circuit at the frequency of the applied tone.

5 Claims, 3 Drawing Figures

TONE ELIMINATION CIRCUIT

BACKGROUND OF THE INVENTION

This invention relates to a circuit for use with telephone exchange systems comprising known electronic subscriber loop interface circuits (SLIC) or Borsht hybrid circuits, and more particularly to a circuit for suppressing a tone from being transmitted over a carrier channel while allowing the tone to be transmitted to the calling subscriber loop wherein said tone may be utilized in signalling telephone call charges.

As is generally understood, SLICs and Borsht hybrid circuits provide signal conversion between a balanced two wire bidirectional subscriber loop transmission path and a pair of unidirectional transmission paths and are typically employed in telephone exchange systems to provide interface between a telephone carrier channel and a subscriber loop, including a telephone handset, at the central office equipment. U.S. Pat. No. 4,004,109 describes such hybrid circuits and their applications.

In some telephone exchange systems it may be desirous to apply short signal bursts or a tax tone impulse signal to the hybrid circuits coupled to the subscriber loop of a telephone calling party to operate a tax counter incorporated into the telephone in order to determine the telephone call charge. Typically this tax tone would be at a frequency different from the normal signal frequency band of the carrier channel. The problem associated with this scheme arises from the nature of contemporary solid state SLIC or Borsht hybrid circuits now being used.

In application, a signal transmitted over the carrier channel is applied at the unidirectional receive wire pair terminals of the SLIC or Borsht hybrid circuit to cause an related signal to appear at the balanced bidirectional subscriber loop terminal to be received by the subscriber. Further, a signal originating from the subscriber is applied to the hybrid from the bidirectional subscriber loop to cause an related signal to appear at the unidirectional transmission wire pair path of the hybrid to be transmitted over the carrier channel. The hybrid circuit, however, cannot distinguish the origin of a signal appearing at the two wire pair of the bidirectional subscriber loop. Hence, a signal received on a unidirectional wire pair and causing an equivalent output signal to appear at the two wire bidirectional subscriber loop also causes an equivalent signal to appear on the unidirectional transmit two wire pair. In normal operation, the received signals are suppressed from being retransmitted over the carrier channel by adding an appropriately phased portion of the signal on the receive wire pair directly to that on the transmit wire pair as is known. The conditions for exact cancellation involve the values of the two wire output impedance of the hybrid circuit and the subscriber loop impedance. Variations of either of these impedances from the design center value will result in some transfer of the signal from the unidirectional receive wire pair to the unidirectional transmit wire pair.

In a scheme now being considered the tax tone impulses may be applied to the unidirectional receive wire pair of the SLIC or Borsht hybrid circuit associated with the calling party. Although the cancelling method utilized in the hybrid circuits described above will tend to reduce the signal transfered to the unidirectional transmit wire pair (and hence to the called party) the actual reduction will be inadequate because the impedances at the tax tone frequency cannot be controlled to the necessary accuracy. Hence, there is a need for a circuit which will allow tax impulse signals to be applied to the subscriber loop of the calling party while suppressing transmission thereof to the called party which is independent of the subscriber line impedance of the calling party.

SUMMARY OF THE INVENTION

Accordingly, it is an object of the present invention to provide a circuit and method for allowing impulse signals to be transmitted to a calling subscriber loop in a telephony exchange system comprising a solid state hybrid circuit while suppressing the same to the called subscriber loop thereof.

Another object of the invention is to provide an improved tone elimination circuit for reducing the level of an impulse signal transmitted to a called party in a telephony system with respect to that transmitted to the calling party.

Still another object of the invention is to provide a circuit and method for suppressing an impulse signal transmitted to a called party in a telephony system which circuit operates independently to the subscriber line impedance of the calling party.

An additional object of the invention is to provide a circuit in combination with a solid state hybrid circuit which provides an interface between a pair of undirectional transmission paths and a balanced bidirectional two wire transmission path which reduces the two wire output impedance of the hybrid circuit at a predetermined tone frequency to a value substantially below the value of said impedance in the normal signal frequency band during normal operation.

In accordance with the foregoing and other objects, there is provided a tone elimination circuit suitable to be utilized in a solid state hybrid circuit in a communication system which provides an interface between a pair of unidirectional transmission paths and a balanced two wire bidirectional transmission path loop which inhibits transmission over the unidirectional transmission path of an impulse tone signal that is applied onto the unidirectional receive path, the tone elimination circuit including a tone signal cancellation circuit which detects the tone signal appearing on the unidirectional transmit path to supply a first anti-phase signal to the tone signal onto said unidirectional transmit path to reduce the residual tone signal appearing thereon and for supplying a second signal of fixed relationship to said first signal onto said unidirectional receive path whereby the output impedance of the hybrid circuit which is coupled to said bidirectional transmission path is caused to be varied.

DETAILED DESCRIPTION OF THE INVENTION

Figure 1:
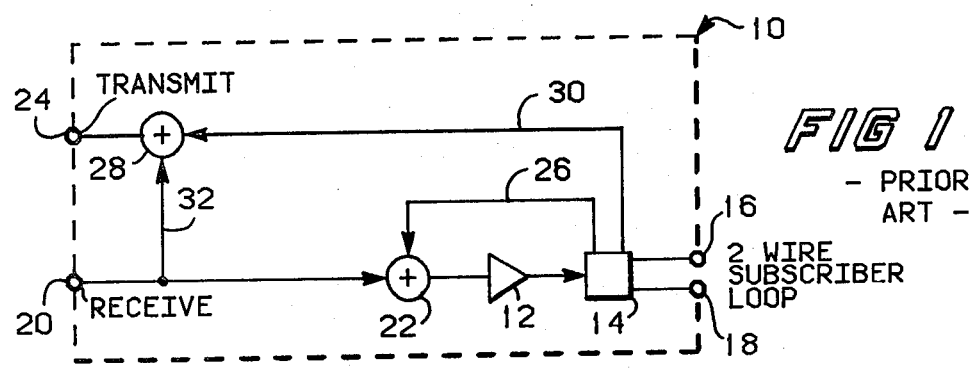
FIG. 1 is a simplified functional signal flow block diagram of a known hybrid circuit.

Turning to FIG. 1, there is shown a simplified functional signal flow diagram of a hybrid circuit known to those skilled in the art for interfacing between a two wire balance bidirectional subscriber loop and the four wire transmit and receive transmission paths in a telecommunication system. Besides U.S. Pat. No. 4,004,109 previously mentioned, French Pat. No. 2,430,153 describes a hybrid circuit of the type shown in the FIGURE. In general operation of the conversion portion of hybrid circuit 10 buffer amplifier 12 is coupled via a signal return generator 14 to the balanced two wire subscriber loop. As understood return signal generator 14 is responsive to the output of buffer amplifier 12 to provide a differential voltage drive onto the two wire subscriber loop at terminals 16 and 18 in response to a receive signal being supplied at four wire receive input terminal 20 via summing circuit 22 to the input of buffer amplifier 12. For simplicity only one wire of each pair of unidirectional receive and transmit (terminal 24) is shown; it being assumed that a common ground reference is present. Signal generator 14 being ideally a voltage generator would otherwise present a very low impedance at terminals 16 and 18 to the subscriber loop impedance which comprises the impedance of a telephone handset and telephone cables. However, to provide maximum matching to the loop impedance the output impedance of signal generator 14 appearing at the output terminals 16 and 18 must be equal to the finite loop impedance. Thus, in order to increase the impedance appearing at the output terminals current feedback via lead 26 is utilized to summing circuit 22. Hence, the impedance presented to the subscriber loop is defined by this feedback loop as is generally understood.

Additionally, signal generator 14 has current sensing to determine the signal current driven onto the subscriber loop from the telephone handset connected thereto. Thus any current driven into the loop either by the signal generator or from the telephone handset is supplied to additional summing circuit 28 via lead 30. The currents in lead 26 and lead 30 are substantially equal. The signal on lead 30 due to the receive signal is effectively cancelled by being of equal value but in anti-phase with respect to a portion of the receive signal occurring at receive terminal 20 which is supplied to summing circuit 28 via lead 32. However, the signal originating from the subscriber loop coupled to the two wire input of hybrid circuit 10 at terminals 16 and 18 causes the signal generated therefrom by return signal generator 14 of levels dependent on the output impedance defined by the feedback loop to be supplied to summing circuit 28 and then to be transmitted over the unidirectional path which is coupled to terminal 24.

Figure 2:
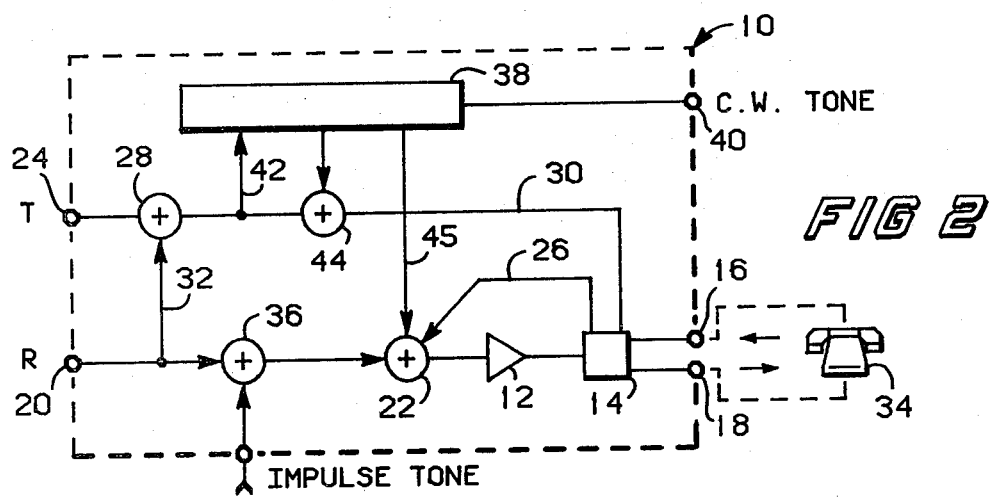
FIG. 2 is a partial block and schematic diagram useful for explaining the circuit and method of the present invention.

FIG. 2 illustrates the invention wherein impulse tones may be supplied onto the unidirectional receive path and sent to the calling subscriber connected via loop terminals 16 and 18 via telephone handset 34. Components in FIG. 2 corresponding to like components in FIG. 1 are shown with the same reference numerals. Impulse tones may be utilized to activate a tax counter in handset 34 for calculating a telephone call charge. It is recognized that it is undesirous to have the tax impulse tones transmitted to the called party. However, as specified the tax impulse signals are typically a 12 kilohertz signal. Present day solid state hybrids as aforedescribed cannot inhibit the tax impulse tones driven onto the subscriber loop from being transmitted to the called party via lead 30. Thus, it is the purpose of the present invention as will be explained to allow a tax impulse tone to be applied to the calling subscriber while inhibiting the signal from being transmitted to the called party and doing so independently of the subscriber loop impedance.

As illustrated, the tax impulse tone is inserted in the receive signal path via summing circuit 36, which insertion occurs after the anti-phase portion of receive signal with respect to the receive signal component of signal occurring over lead 30 is supplied to summing circuit 28. Hence, the tax impulse signal is transmitted to summing circuit 22 and to the two wire subscriber loop but not to summing circuit 28. A tax impulse signal cancellation circuit 38 is provided which is adapted to receive a continuous wave signal of the frequency of the tax impulse signal at terminal 40. An additional input is supplied to circuit 38 via lead 42. A first output from circuit 38 is coupled to summing circuit 44 which also receives the input signal from generator 14 via lead 30. The output of summing circuit 44 is provided to summing circuit 28 and to lead 42 to provide the input to circuit 38. A second and equivalent output of circuit 38 is also supplied to summing circuit 22.

As will be explained, cancellation circuit 38 acts as a notched filter at the frequency of the tax impulse tone to effectively eliminate any feedback at this frequency which in turn reduces the effective impedance at the output of the signal return generator 14. Thus, the cancellation circuit 38 acts to reduce the level of the tax impulse signals detected at the first input via lead 42 to a very low level, by adding thereto, via summer 44, an appropriate anti-phase signal derived from the continuous tax tone signal applied at input 40. As the anti-phase signal supplied by the cancellation circuit to summing circuit 44 is substantially equal to the tax impulse signal supplied thereto by return signal generator 14 it follows that a second related output may be obtained from the cancellation circuit related to the tax impulse tone signal supplied from return signal generator 14 to first summing circuit 22. By adding the second output from cancellation circuit 38 into summing circuit 22 the feedback signal generated in response to the tax impulse tone over lead 26 may be cancelled, wholly or partially, depending on the magnitude of the anti-phase signal supplied via lead 45. Assuming the feedback at the tax impulse tone via lead 26 to be of appropriate magnitude and phase, the cancellation circuit 38 will reduce the output impedance appearing at nodes 16 and 18 at the tax tone frequency to some value below its value in the normal communication frequency band.

It is noted that in some feedback systems the feedback must be increased to reduce the output impedance of hybrid circuit 10 for instance. In such cases, the output via lead 45 from cancellation circuit 38 must be adapted to be in-phase with the tax impulse signal supplied to summing circuit 22 by the return signal generator 14 over lead 26. The addition of this second output in summing circuit 22 then effectively increases the total feedback at this frequency at thus reduces the output impedance appearing at the output of hybrid circuit 10.

Figure 3:
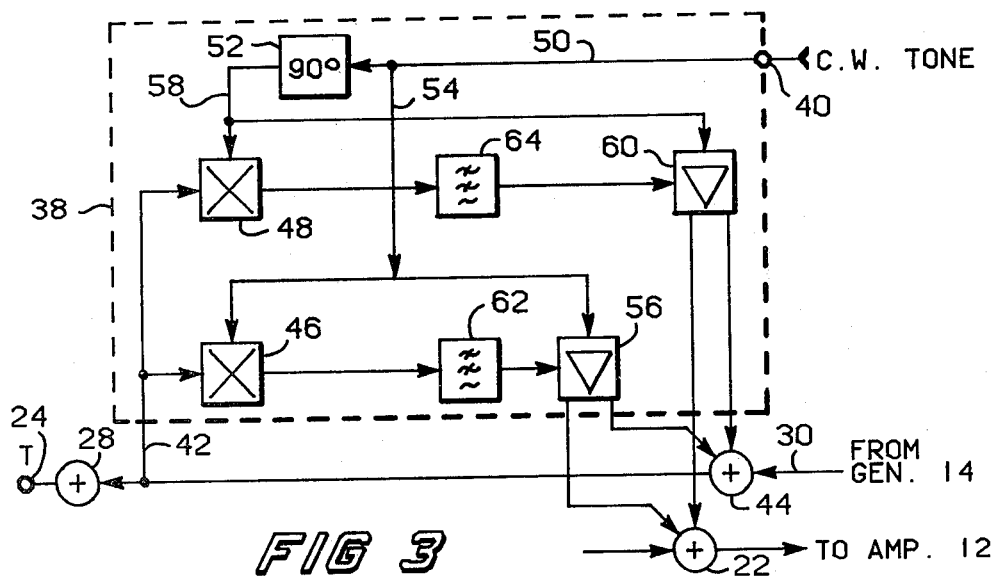
FIG. 3 is a partial block and schematic diagram showing one preferred embodiment of a tone cancellation circuit of the present invention.

FIG. 3 illustrates by way of a block schematic diagram a realization of cancellation circuit 38 without attempting to limit the present invention since other circuits may be utilized to the provide the function of a notch filter as previously described. It should be recognized that the signal obtained from signal generator 14 depends on the impedance of the subscriber line and in general will not be in-phase with the tax tone signal applied to summing circuit 36. It may therefore be necessary to detect and cancel both in-phase and quadrature phase components of the tax impulse signal appearing at the first input to cancellation circuit 38 via lead 42. The impulse tax tone signal appearing via lead 42 to the input of cancellation circuit 38 is applied to a first input of modulators 46 and 48. A second input of modulator 46 receives the continuous wave tone at the tax impulse frequency via leads 50 and 54 with a second input of modulator 48 receiving the same continuous wave tone shifted in phase by 90° via phase shifter 52 and lead 58. The outputs of modulators 46 and 48 are applied respectively via low pass filters 62 and 64 to the control terminals of a pair of gain controlled amplifiers 56 and 60. The input terminals of gain control amplifiers 56 and 60 are coupled to the respective second input of modulators 46 and 48 to receive the continuous tax tone signal applied at the second inputs. A first output from each gain control amplifier is added to the signal from return signal generator 14 at summing circuit 44. A second output from each amplifier which is related to the signal appearing at the first output from each amplifier is added to the feedback signal applied to buffer amplifier 12 via summing circuit 22.

In operation, the presence of the tax tone signal at lead 42 to the input of cancellation circuit 38 will result in a generation of a direct current output signal from modulators 46 and 48 dependent on the amplitude and relative phase of the signal appearing via lead 42. These output signals, after filtering, adjust the gains of the gain control amplifiers 56 and 60 which are supplied with in-phase and quadrature phase input signals at the continuous tone frequency. Hence, gain control amplifiers 56 and 60 supply signals to summing circuit 44 to cancel the tax tone impulse signal occurring over lead 30. It is understood that any tax tone signal appearing over lead 42 may be decomposed into a component in-phase with the continuous tax tone supplied at input 40 and a components in quadrature with the tone. The former component will produce a direct current output from modulator 46 which controls the in-phase component cancellation via amplifier 56 while the latter will produce a direct current output from modulator 48 which controls the quadrature component cancellation via gain control amplifier 60. Since modulator 46 is not responsive to components in quadrature with the continuous tone supplied at input 40 and modulator 48 is not responsive to components in-phase with the continuous wave tone the two cancellation circuits may operate simultaneously and independently of each other. Furthermore, it is noted that the in-phase and in quadrature cancellation circuits may be connected in series along the four wire unidirectional transmission path instead of in parallel as is shown in FIG. 3. Cancellation circuit 38 as well as hybrid circuit 10 are suitable to be manufactured in integrated circuit form as generally is understood.

It should be recognized from the foregoing that a unique feature of the present invention is that cancellation of the impulse tone is independent of the frequency of the impulse tone, i.e., the cancellation circuit provides cancellation of the tone without the need for external adjustment components as long as the continuous wave tone supplied thereto is maintained at the same frequency as the impulse tone. Since the impulse tone and continuous wave tone are both supplied at the central office this requirement is easily maintained.

We claim:

1. In a hybrid circuit providing interface between a pair of unidirectional transmission paths and a balanced two-wire bidirectional subscriber loop including signal generator means responsive to signal inputs for supplying a driving signal into the subscriber loop and being responsive to differential signals on the subscriber loop for supplying driving signals onto the transmit path of the unidirectional transmission paths and having a feedback loop coupled from an output of the signal generator to the input thereof, a cancellation circuit responsive to an impulse signal of predetermined frequency being inserted on the transmit path from the signal generator and a continuous wave signal of said predetermined frequency for generating a first, antiphase, signal of equal magnitude to said impulse signal at a first output thereof, said antiphase signal being summed with said impulse signal to reduce the level of the same.

2. The cancellation circuit of claim 1 responsive to said impulse signal for generating a second signal of fixed relationship to said first signal at a second output thereof, said second signal being summed with said impulse signal appearing in the feedback loop to cancel all or a portion thereof to vary the output impedance of the signal generator.

3. The cancellation circuit of claim 2 including:
   first circuit means responsive to said impulse signal of predetermined frequency and said continuous wave signal for generating a first output signal component in phase with said impulse signal; and
   second circuit means responsive to said impulse signal and said continuous wave signal for generating a second output signal component in quadrature phase with said impulse signal.

4. The cancellation circuit of claim 3 wherein said first circuit means includes:
   first modulator means responsive to said impulse signal and said continuous wave signal for supplying an output signal the amplitude of which is dependent on the amplitude and relative phase of said impulse signal respective to said continuous wave signal;
   first filter means coupled to an output of said first modulator means for supplying a gain adjust signal; and
   first gain-controlled amplifier means receiving said continuous wave signal for producing an output signal having an in-phase component relationship to said impulse signal the amplitude of which is varied in accordance with the amplitude of said gain adjust signal supplied thereto from said first filter means.

5. The cancellation circuit of claim 3 or 4 wherein said second circuit means includes:
   second modulator means responsive to said impulse signal and a signal which is in quadrature to said continuous wave signal for supplying an output signal at an output thereof the amplitude of which is dependent on the amplitude and relative phase of said impulse signal respective to said quadrature continuous wave signal;
   second filter means coupled to said output of said second modulator means for supplying a gain adjust signal; and
   second gain-controlled amplifier means receiving said quadrature signal for producing an output signal having a quadrature component relationship to said impulse signal the amplitude of which is varied in accordance with the amplitude of said gain adjust signal supplied thereto from said second filter means.

* * * * *